US010324783B1

(12) United States Patent
Saha et al.

(10) Patent No.: US 10,324,783 B1
(45) Date of Patent: Jun. 18, 2019

(54) SYSTEM AND METHOD FOR WORKFLOW ERROR HANDLING

(71) Applicant: ServiceNow, Inc., Santa Clara, CA (US)

(72) Inventors: Prabodh Saha, Telangana (IN); Venkata Satya Sai Rama Murthy Manda, Bellevue, WA (US); Manojkumar Shende, Redmond, WA (US)

(73) Assignee: SERVICENOW, INC., Santa Clara, CA (US)

( * ) Notice: Subject to any disclaimer, the term of this patent is extended or adjusted under 35 U.S.C. 154(b) by 143 days.

(21) Appl. No.: 15/254,301

(22) Filed: Sep. 1, 2016

(51) Int. Cl.
*G06F 11/07* (2006.01)
(52) U.S. Cl.
CPC .................................. *G06F 11/079* (2013.01)
(58) Field of Classification Search
CPC ............... G06F 11/079; G06F 11/0793; G06F 17/30477; G06F 17/30539
See application file for complete search history.

(56) References Cited

U.S. PATENT DOCUMENTS 7,237,138 B2 * 6/2007 Greenwald ......... G06F 11/2257 714/4.3
7,739,135 B2 * 6/2010 Shukla ............... G06Q 10/0633 370/245
9,015,533 B1 * 4/2015 Fateev ................ G06F 11/0742 714/38.1
2003/0023476 A1 1/2003 Gainey
2007/0294258 A1 12/2007 Caldwell et al.

FOREIGN PATENT DOCUMENTS

WO WO-2014022154 A1 * 2/2014 ............ G06F 11/008

OTHER PUBLICATIONS

Erdogan, Kemal; "A Model to Represent Directed Acyclic Graphs (DAG) On SQL Databases", Code Project, http://www.codeproject.com/Articles/22824/A-Model-to-Represent-Directed-Acyclic-Graphs-DAG-o, dated Jan. 14, 2008, Downloaded Aug. 31, 2016, 17 pp.
Radev, Radoslav; "Representing a Relational Database as a Directed Graph and Some Applications", BCI Sep. 19, 2013, Thessaloniki, Greece. 8 pp.

* cited by examiner

*Primary Examiner* — Joseph R Kudirka
(74) *Attorney, Agent, or Firm* — Fletcher Yoder PC

(57) ABSTRACT

A system can include a processor configured to generate a query for a workflow results table, the query including query criteria to include records not having an associated child in the workflow results table and having a value indicating an unsuccessful status. The processor can be further configured to execute the query against the workflow results table to identify at least one activity record having a value indicating an unsuccessful status for the execution of at least one respective workflow activity. The processor can be further configured to generate a graph of workflow activity records between the at least one activity record and a root workflow activity record using context information associated with the workflow activity records. The processor can be further configured to determine an automated remedial action based on the graph of workflow activity records and to execute the remedial action.

17 Claims, 6 Drawing Sheets

US 10,324,783 B1

SYSTEM AND METHOD FOR WORKFLOW ERROR HANDLING

TECHNICAL FIELD

The present disclosure relates in general to techniques and devices for workflow error handling.

BACKGROUND

Workflows, or workflow automations, generally relate to automating multi-step processes. A workflow can include a series of workflow activities. Workflow activities can execute successfully or unsuccessfully during execution of the workflow.

SUMMARY

Disclosed herein are implementations of systems and methods for workflow error handing.

According to an implementation, a system for identifying an unsuccessful workflow activity and a workflow path associated with the unsuccessful workflow activity can include a server device including a processor, a memory, and a network interface. The memory includes instructions executable by the processor to generate a query for a workflow results table, and the query includes query criteria to include a) records not having an associated child in the workflow results table and b) records having a value indicating an unsuccessful status. The processor can be further configured to execute the query against the workflow results table to identify at least one activity record having a value indicating an unsuccessful status for the execution of at least one respective workflow activity. The processor can be further configured to generate a graph of workflow activity records between the at least one activity record and a root workflow activity record using context information associated with the workflow activity records. The processor can be further configured to determine an automated remedial action based on the graph of workflow activity records and to execute the remedial action.

According to an implementation, a method for identifying an unsuccessful workflow activity and a workflow path associated with the unsuccessful workflow activity can include: generating a query for identifying records in a workflow results table, the query including query criteria to include a) records not having an associated child in the workflow results table and b) records having a value indicating an unsuccessful status; executing the query against the workflow results table to identify at least one activity record having a value indicating an unsuccessful status for the execution of at least one respective workflow activity; generating a graph of workflow activity records between the at least one activity record and a root workflow activity record using context information associated with the workflow activity records, determining; by a processor of a server device, an automated remedial action based on the graph of workflow activity records, and executing, by the processor of the server device; the automated remedial action.

According to an implementation, a system for identifying an unsuccessfully executed workflow activity and a workflow path associated with the unsuccessfully executed workflow activity can include a server device including a processor, a memory, and a network interface. The memory includes instructions executable by the processor to receive at least one workflow activity record having context information indicating that the at least one workflow activity record does not have an associated child in a workflow results table and having a value indicating an unsuccessful status for an execution of an activity associated with an execution of a workflow. The processor can be further configured to identify, based on the context information associated with the at least one workflow activity record, one or more parent activity records for the at least one workflow activity record. The process can be configured to identify a root workflow activity record based on a determination of whether one of the one or more parent activity records has an associated child in the workflow results table and does not have an associated parent in the workflow results table. The processor can be configured to generate a graph of workflow activity records between the at least one workflow activity record and an identified root workflow activity record. The processor can be further configured to identify a failure definition associated with the graph of workflow activity records, determine an automated remedial action based on the identified failure definition, and execute the remedial action.

These and other aspects of this disclosure are disclosed in the following detailed description, the appended claims, and the accompanying figures.

BRIEF DESCRIPTION OF THE DRAWINGS

The description herein makes reference to the accompanying drawings, wherein like reference numerals refer to like parts throughout the several views.

DETAILED DESCRIPTION

Figure 1:
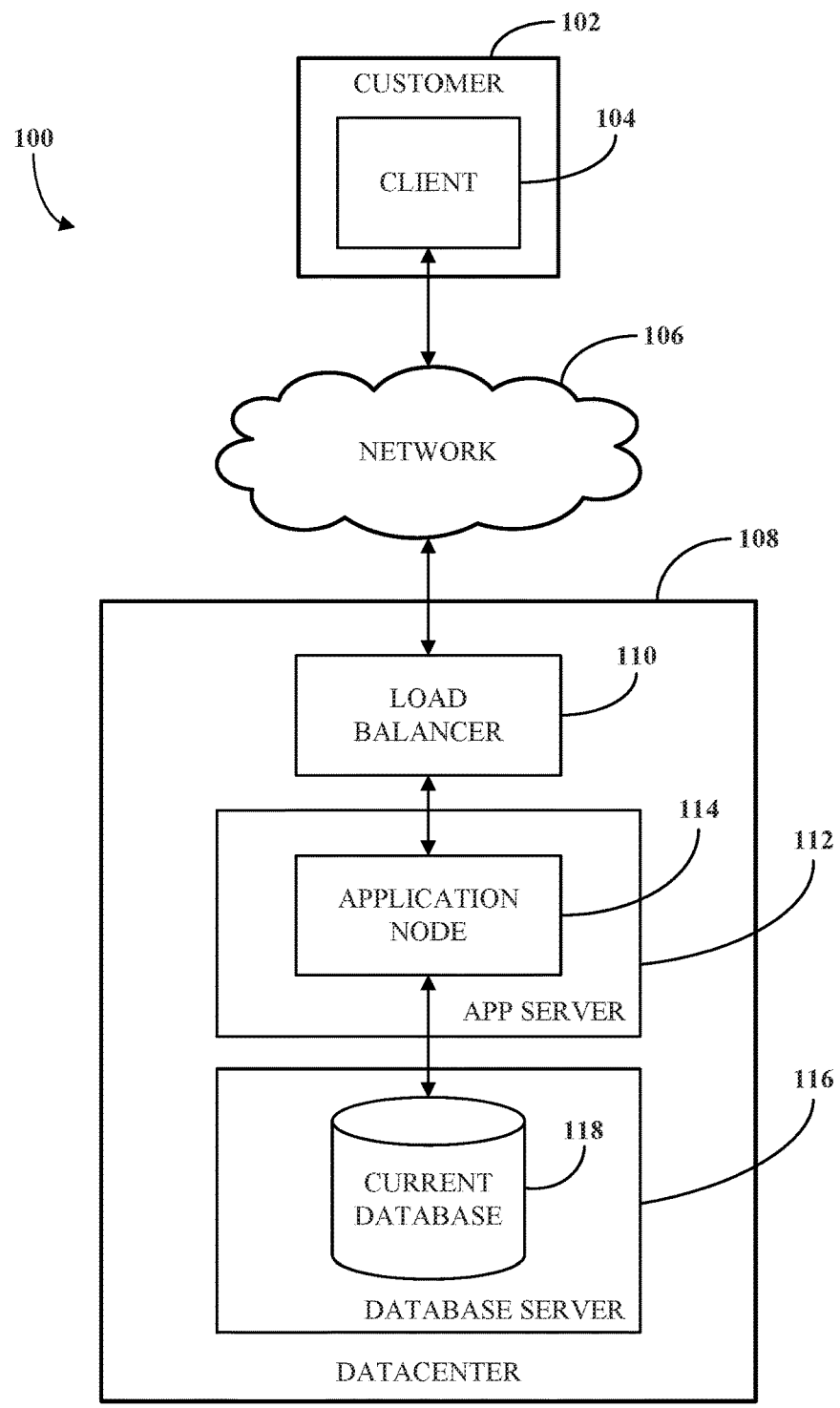
FIG. 1 is a block diagram of an example cloud computing system according to the principles of the present disclosure.

In an electronic computing and communication system ("the computing system"), workflows automate simple or complex multi-step processes. A workflow can be referred to as an application software workflow or a workflow automation. A workflow can include one or more activities that define operations of a workflow. When executed, activities in a workflow can perform activity tasks. Activity tasks can include, but are not limited to, running scripts, generating records, notifying users of pending approvals, or other tasks including those that involve processing inputs or generating outputs. A workflow can include a plurality of transitions. Transitions can define a processing path of a workflow. For example, a first activity can be configured to transition to a second activity in response to a first condition being met and to transition to a third activity in response to a second condition being met. Thus, different executions of the same workflow may result in the execution of different workflow activities or different results relating to the same workflow activities, for example, based on changes in conditions in transitions between workflow activities.

Activities can be executed with or without interaction from a user. For example, a notification activity can be used to notify a user of an event that occurs during a workflow execution. In another example, an approval activity can pause a workflow execution and wait for input, such as an approval, from a user. The execution of a workflow activity can produce workflow results data. Workflow results data can be stored in a workflow results table associated with a results database. The workflow results data can include statuses of executed activities (i.e., successful or unsuccessful), activity identifiers, context information describing how the activities, when executed, relate to other executed activities in the workflow execution, other suitable information, or a combination thereof.

In some implementations, a large number of workflows can be executed simultaneously or substantially simultaneously. For example, multiple instances of the same workflow, different workflows, or a combination of multiple instances of the same workflow and different workflows can be executed. Accordingly, in such an implementation, a large number of activities can be executed by the computing system.

The workflow results data can be used to generate a graph of the results of executed workflow activities. Edges in the graph are transitions between workflow activities that can be represented using context information associated with executed workflow activities. The edges represent an order in which activities were executed within the workflow. Identifying unsuccessful activity executions and the activity executions leading up to the unsuccessful activity executions using the workflow results data can be difficult when there are large numbers of workflow activities executed. One process for identifying unsuccessfully executed workflow activities is to traverse a graph provided by the workflow results table. This process can be time- and resource-consuming and has a computational complexity of O(n).

An improved approach is to use the relational database structure in which the workflow activity results are stored to perform a relational database query to identify workflow results having a status of interest (e.g., unsuccessful) and context information of interest (e.g., no child relationship and an association to a particular workflow execution). This can provide a computational complexity of O(1). The query result can include one or more activity records matching the query. The workflow records for the activity executions leading up to the matching workflow results can be defined using a simplified graph traversal only for the identified workflow results.

In some implementations, the computing system can be configured to produce reports usable by users to monitor or analyze data or results associated with a plurality of workflow executions. In some implementations, the computing system can be configured to identify records corresponding to unsuccessfully executed activities. The computing system can identify a failure pattern associated with an identified unsuccessfully executed activity. The computing system can be configured to identify one or more remedial actions to take in response to the failure pattern associated with an identified unsuccessfully executed activity and to execute the remedial action.

To describe some implementations in greater detail, reference is first made to examples of hardware structures. FIG. 1 is a block diagram of an example of an electronic computing and communication system 100 in accordance with this disclosure. As used herein, the term "electronic computing and communication system," or variations thereof, can be, or include, a distributed computing system, such as a client-server computing system, a cloud computing system, a clustered computing system, or the like.

The system 100 can include one or more customers 102. The customer 102 can include one or more clients. For example, and without limitation, the customer 102 can include a client 104. The client 104 can comprise a computing system, which can include one or more computing devices, such as a mobile phone, a tablet computer, a laptop computer, a notebook computer, a desktop computer, or any other suitable computing device or combination of computing devices. In some implementations, the client 104 can be implemented as a single physical unit or a combination of physical units. In some implementations, a single physical unit can include multiple clients.

In some implementations, the client 104 can be an instance of an application running on a customer device associated with the customer 102. As used herein, the term "application" can include, but is not limited to, applications, programs, instances, processes, threads, services, plugins, patches, application version upgrades, or any other identifiable computing unit capable of accessing or interacting, directly or indirectly, with a database. The system 100 can include any number of customers or clients or can have a configuration of customers or clients different from that generally illustrated in FIG. 1. For example, and without limitation, the system 100 can include hundreds or thousands of customers and at least some of the customers can include or be associated with any number of clients. A customer can include a customer network or domain. For example, and without limitation, the client 104 can be associated or communicate with a customer network or domain.

The system 100 can include a datacenter 108. The datacenter 108 can include one or more servers. For example, and without limitation, the datacenter 108, as generally illustrated, includes an application server 112 and a database server 116. A datacenter, such as the datacenter 108, can represent a geographic location, which can include a facility, where the one or more servers are located. The system 100 can include any number of datacenters and servers or can include a configuration of datacenters and servers different from that generally illustrated in FIG. 1. For example, and without limitation, the system 100 can include tens of datacenters and at least some of the datacenters can include hundreds or any suitable number of servers. In some implementations, the datacenter 108 can be associated or communicate with one or more datacenter networks or domains, which can include domains other than the client domain.

In some implementations, the client 104 and the servers associated with the datacenter 108 are configured to connect to, or communicate via, a network 106. In some implementations, a client 104 associated with the customer 102 can connect to the network 106 via a communal connection point, link, or path. In some implementations, a client 104 associated with the customer 102 can connect to, or communicate via, the network 106 using a distinct connection point, link, or path. A connection point, link, or path can be wired, wireless, or a combination thereof.

In some implementations, the network 106 can include, for example, the Internet. In some implementations, the network 106 can be, or include, a local area network (LAN), a wide area network (WAN), a virtual private network (VPN), or any other public or private means of electronic computer communication capable of transferring data between a client, such as the client 104, and one or more servers associated with the datacenter 108, or a combination thereof. The network 106, the datacenter 108, or any other element, or combination of elements, of the system 100 can include network hardware such as routers, switches, load balancers, other network devices, or combinations thereof. For example, the datacenter 108 can include a load balancer 110 for routing traffic from the network 106 to various servers associated with the datacenter 108.

The load balancer 110 can route, or direct, computing communication traffic, such as signals or messages, to respective elements of the datacenter 108. For example, the load balancer 110 can operate as a proxy, or reverse proxy, for a service, such as an Internet-delivered service, provided by the datacenter 108 to one or more remote clients, such as the client 104, via the network 106. Routing functions of the load balancer 110 can be configured directly or via a Domain Name System (DNS). The load balancer 110 can coordinate requests from remote clients, such as the client 104, and can simplify client access by masking the internal configuration of the datacenter 108 from the remote clients. Request coordination can include maintaining information for sessions, such as sticking sessions, between a client and a service or application provided by the datacenter 108.

In some implementations, maintaining information for a sticky session can include maintaining information to forward requests associated with a session from a client to an identified element of the datacenter 108 for the session. A load balancer 110 can operate as a firewall, allowing or preventing communications based on configuration settings. Although the load balancer 110 is depicted in FIG. 1 as being within the datacenter 108, in some implementations, the load balancer 110 can instead be located outside of the datacenter 108, for example, when providing global routing for multiple datacenters. In some implementations, load balancers can be included both within and outside of the datacenter 108.

In some implementations, the datacenter 108 includes an application server 112 and a database server 116. The application server 112 or the database server 116 can be a computing system, which can include one or more computing devices, such as a desktop computer, a server computer, or any other computer capable of operating as a server. In some implementations, the application server 112 or the database server 116 can be non-hardware servers implemented on a physical device, such as a hardware server. In some implementations, the application server 112 and the database server 116 can be implemented as a single hardware server or as a single non-hardware server implemented on a single hardware server. In some implementations, any number of application servers or database servers can be implemented at the datacenter 108. In some implementations, the datacenter 108 can include servers other than or in addition to the application server 112 or the database server 116, for example, a web server.

In some implementations, the application server 112 includes an application node 114, which can be a process executed on the application server 112. For example, and without limitation, the application node 114 can be executed in order to deliver services to a client, such as the client 104, as part of a web application. The application node 114 can be implemented using processing threads, virtual machine instantiations, or other computing features of the application server 112. In some implementations, the application node 114 can store, evaluate, or retrieve data from a database, such as the database 118 of the database server 116.

In some implementations, the application server 112 can include any suitable number of application nodes, depending upon a system load or other characteristics associated with the application server 112. For example, and without limitation, the application server 112 can include two or more nodes forming a node cluster. In some implementations, the application nodes implemented on a single application server 112 can run on different hardware servers.

The database server 116 can be configured to store, manage, or otherwise provide data for delivering services to the client 104 over a network. In some implementations, the database server 116 includes a data storage unit, such as a database 118, which can be accessible by an application executed on the application node 114. In some implementations, the database 118 can be implemented as a relational database management system (RDBMS), an object database, an XML database, a configuration management database (CMDB), a management information base (MIB), one or more flat files, other suitable non-transient storage mechanisms, or a combination thereof. By way of non-limiting example, the system 100, in some implementations, can include an XML database and a CMDB. While limited examples are described, the database 118 can be configured as or comprise any suitable database type. Further, the system 100 can include one, two, three, or any suitable number of databases configured as or comprising any suitable database type or combination thereof.

In some implementations, the database 118 can be configured as or comprise a CMDB. A CMDB can be comprised of a plurality of configuration items (CIs), attributes associated with the CIs, or relationships between CIs. A CI can be a CMDB record that represents an infrastructure entity, device, or units of the system 100. For example, the customer 102, the client 104, the network 106, the datacenter 108, the load balancer 110, the application server 112, the application node 114, the database server 116, the database 118, or any other element, portion of an element, or combination of elements of the electronic computing and communication system 100 can be represented in the CMDB by a CI.

The CMDB can include information describing the configuration, the role, or both the configuration and the role, of an element of the system 100. In some implementations, an MIB can include one or more databases listing characteristics of the elements of the system 100. In some implementations, an object identifier (OID) can represent object identifiers of objects or elements in the MIB.

In some implementations, one or more databases (e.g., the database 118), tables, other suitable information sources, or portions or combinations thereof, can be stored, managed, or otherwise provided by one or more of the elements of the system 100 other than the database server 116, such as the client 104 or the application server 112.

Some or all of the systems and methods described herein can operate or be executed on or by the servers associated with the system 100. For example, an update for an application executed on the application node 114 can include updating or upgrading the database 118. In some implementations, the systems and methods described herein, portions thereof, or combinations thereof, can be implemented on a single device, such as a single server, or a combination of devices, for example, a combination of the client 104, the application server 112, and the database server 116.

In some implementations, the system 100 can include devices other than the client 104, the load balancer 110, the application server 114, and the database server 116 as generally illustrated in FIG. 1. In some implementations, one or more additional servers can operate as an electronic computing and communications system infrastructure control, from which servers, clients, or both servers and clients, can be monitored, controlled, configured, or a combination thereof.

In some implementations, the network 106, one or more datacenters, such as the datacenter 108, and one or more load balancers, such as the load balancer 110, can be implemented within a distributed computing system. In some implementations, a load balancer associated with a distributed computing system (e.g., the load balancer 110) can communicate with the network 106, one or more datacenters (e.g., the datacenter 108), other load balancers, or a combination thereof. In some implementations, the load balancer 110 can be configured to route communications to a primary datacenter, identify a failover condition (e.g., such as an enumerated failover condition) at the primary datacenter, and redirect communications to a secondary datacenter until the failover condition is resolved. Although illustrated as a single unit in FIG. 1, a load balancer 110 can be implemented as multiple physical or logical units. For example, a distributed computing system can include distinct routing units, load balancing units, firewall units, or the like.

The primary datacenter can include a primary database, such as the database 118, and the secondary datacenter can include a secondary database. In some implementations, the secondary database can include an exact or substantially exact mirror, copy, or replication of the primary database. In some implementations, the primary database or the secondary database can be implemented as a relational database management system (RDBMS), an object database, an XML database, one or more flat files, or the like.

An application node implemented within a distributed computing environment can connect to or communicate with the primary database, which can be associated with the datacenter with which the application node is associated, or associated with another datacenter. For example, a primary datacenter can include a primary database and a first set of application nodes. A secondary datacenter can include a secondary database and a second set of application nodes. The application nodes of the first and second sets can provide a service or application to remote clients, and can read or write data in the primary database. The secondary database can mirror changes made to the primary database and prevent write operations from being performed directly on the secondary database. In the event that a failover condition associated with the primary database is identified, the secondary database can operate as the primary database and can allow read or write access to data. The primary database can then operate as the secondary database, mirror the new primary database, and prevent direct write access to the new secondary database.

In some implementations, a distributed computing system can allocate resources of a computer network using a multi-tenant or single-tenant architecture. Allocating resources in a multi-tenant architecture can include installations or instantiations of one or more servers, such as application servers, database servers, or any other server, or combination of servers, that can be shared amongst multiple customers. For example, a web server, such as a unitary Apache installation; an application server, such as a unitary Java Virtual Machine; and a single database server catalog, such as a unitary MySQL catalog, can handle requests from multiple customers. In some implementations of a multi-tenant architecture, the application server, the database server, or both can distinguish between and segregate data or other information of the various customers using the system.

In a single-tenant infrastructure (which can also be referred to as a multi-instance architecture), separate web servers, application servers, database servers, or combinations thereof can be provisioned for at least some customers or customer sub-units. In some implementations, customers or customer sub-units can access one or more dedicated web servers, have transactions processed using one or more dedicated application servers, or have data stored in one or more dedicated database servers, catalogs, or both. Physical hardware servers can be shared such that multiple installations or instantiations of web servers, application servers, database servers, or combinations thereof, can be installed on the same physical server. An installation can be allocated a portion of the physical server resources, such as RAM, storage, communications bandwidth, or processor cycles.

In some implementations, a customer instance can include multiple web server instances, multiple application server instances, multiple database server instances, or a combination thereof. The server instances can be physically located on different physical servers and can share resources of the different physical servers with other server instances associated with other customer instances. In a distributed computing system, multiple customer instances can be used concurrently. Other configurations or implementations of customer instances can also be used. The use of customer instances in a single-tenant architecture can provide, for example, true data isolation from other customer instances, advanced high availability to permit continued access to customer instances in the event of a failure, flexible upgrade schedules, an increased ability to customize the customer instance, or a combination thereof.

Figure 2:
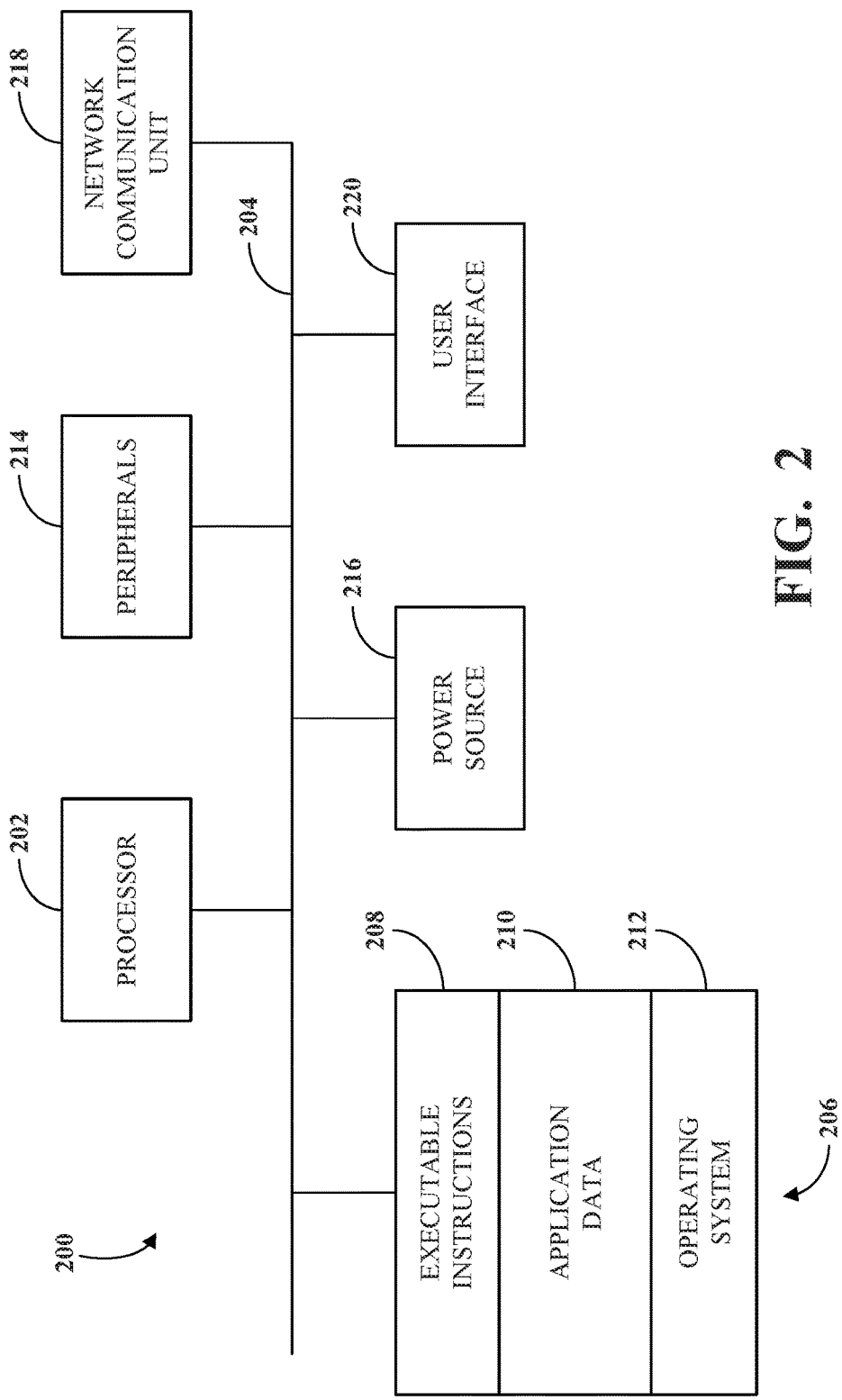
FIG. 2 is a block diagram of an implementation of an internal configuration of a computing device, such as a computing device of the cloud computing system as shown in FIG. 1.

FIG. 2 generally illustrates a block diagram of an example internal configuration of a computing device 200, such as a client 104 or a server, such as an application server 112 or a database server 116, of the electronic computing and communication system 100 as generally illustrated in FIG. 1. As previously described, a client or server can be a computing system including multiple computing devices or a single computing device, such as a mobile phone, a tablet computer, a laptop computer, a notebook computer, a desktop computer, a server computer, or other suitable computing devices.

A computing device 200 can include components or units, such as a processor 202, a bus 204, a memory 206, peripherals 214, a power source 216, a network communication unit 218, a user interface 220, other suitable components, or a combination thereof.

The processor 202 can be a central processing unit (CPU), such as a microprocessor, and can include single or multiple processors having single or multiple processing cores. Alternatively, the processor 202 can include another type of device, or multiple devices, now-existing or hereafter developed capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

In some implementations, the memory 206 can include volatile memory, non-volatile memory, or a combination thereof. For example, the memory 206 can include volatile memory, such as one or more DRAM modules such as DDR SDRAM, and non-volatile memory, such as a disk drive, a solid state drive, flash memory, Phase-Change Memory (PCM), or any form of non-volatile memory capable of persistent electronic information storage, such as in the absence of an active power supply. In some implementations, the memory 206 can include another type of device, or multiple devices, now-existing or hereafter developed capable of storing data or instructions for processing by the processor 202. The processor 202 can access or manipulate data in the memory 206 via the bus 204. Although shown as a single block in FIG. 2, the memory 206 can be implemented as multiple units. For example, a computing device 200 can include volatile memory, such as RAM, and persistent memory, such as a hard drive or other storage.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof, to perform various functions described herein. For example, the executable instructions 208 can include instructions to identify: related requested modifications to a database; generate a batch document including combined; related requested modifications; convert the combined, related requested modifications into a single query; and apply the single query to update a database, such as the database 118. The application data 210 can include, for example, user files, database catalogs or dictionaries, configuration information or functional programs, such as a web browser, a web server, a database server, or a combination thereof. The operating system 212 can be, for example, Microsoft Windows®, Mac OS X®, or Linux®, or an operating system for a small device, such as a smartphone or tablet device; or an operating system for a large device, such as a mainframe computer. The memory 206 can comprise one or more devices and can utilize one or more types of storage, such as solid state or magnetic storage.

The peripherals 214 can be coupled to the processor 202 via the bus 204. The peripherals can be sensors or detectors, or devices containing any number of sensors or detectors, which can monitor the computing device 200 itself or the environment around the computing device 200. For example, a computing device 200 can contain a geospatial location identification unit, such as a global positioning system (GPS) location unit. As another example, a computing device 200 can contain a temperature sensor for measuring temperatures of components of the computing device 200, such as the processor 202. Other sensors or detectors can be used with the computing device 200, as can be contemplated. In some implementations, the power source 216 can be a battery, and the computing device 200 can operate independently of an external power distribution system. Any of the components of the computing device 200, such as the peripherals 214 or the power source 216, can communicate with the processor 202 via the bus 204.

The network communication unit 218 can also be coupled to the processor 202 via the bus 204. In some implementations, the network communication unit 218 can comprise one or more transceivers. The network communication unit 218 can, for example, provide a connection or link to a network, such as the network 106, via a network interface, which can be a wired network interface, such as Ethernet, or a wireless network interface. For example, the computing device 200 can communicate with other devices via the network communication unit 218 and the network interface using one or more network protocols, such as Ethernet, TCP, IP, power line communication (PLC), WiFi, infrared, GPRS, GSM, CDMA, or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the computing device 200 can be provided in addition to or as an alternative to a display. In some implementations, the user interface 220 can include a display, which can be a liquid crystal display (LCD), a cathode-ray tube (CRT), a light emitting diode (LED) display, (e.g., an OLED display), or other suitable display.

In some implementations, a client or server can omit the peripherals 214. The operations of the processor 202 can be distributed across multiple servers and clients which can be coupled directly or across a local area or other suitable type of network. The memory 206 can be distributed across multiple servers and clients, such as network-based memory or memory in multiple servers and clients performing the operations of clients or servers. Although depicted here as a single bus, the bus 204 can be composed of multiple buses, which can be connected to each other through various bridges, controllers, or adapters.

Figure 3:
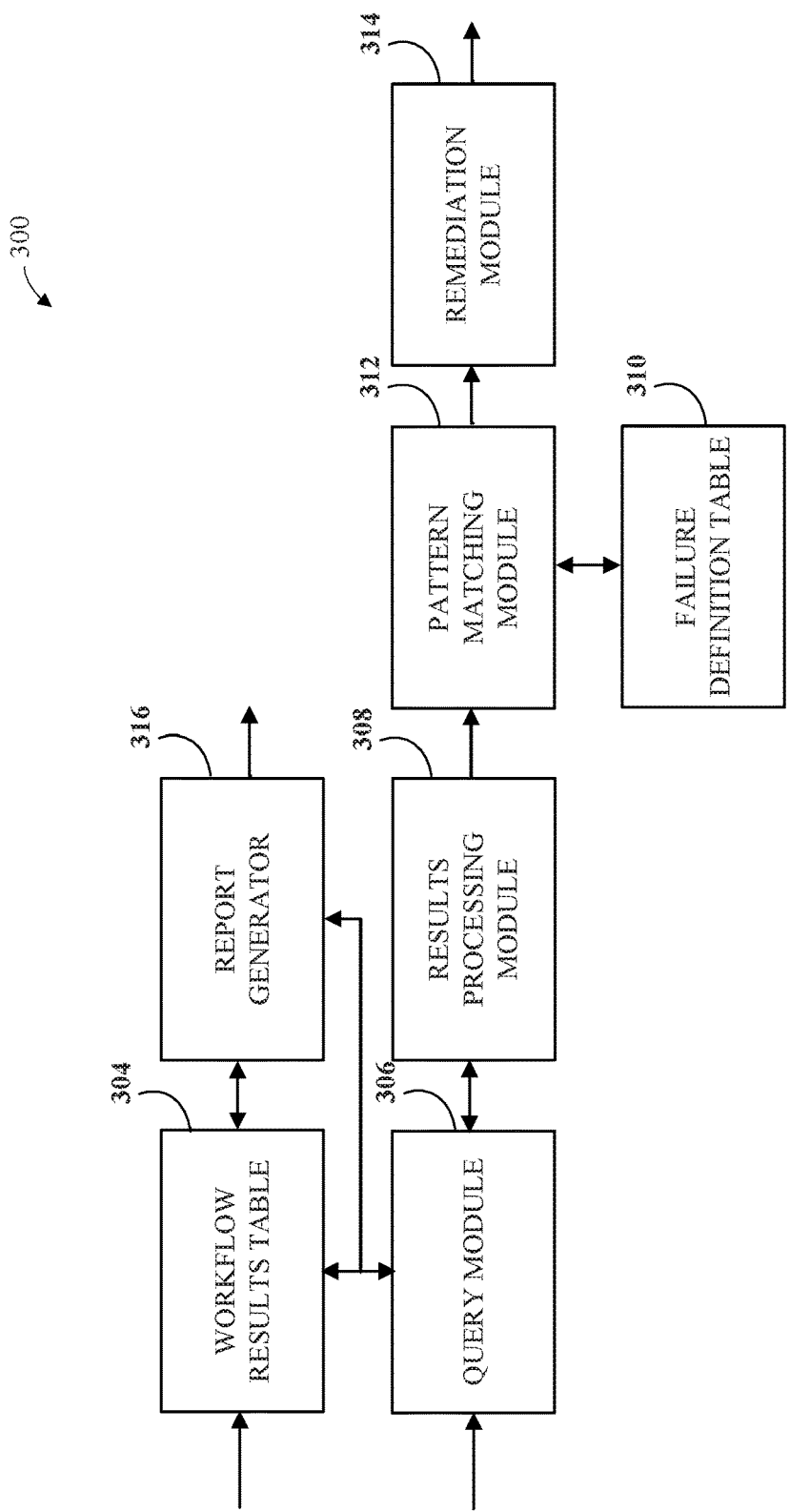
FIG. 3 is a block diagram of an implementation of a workflow error handling system.

FIG. 3 is a block diagram of an implementation of a workflow error handling system 300. In some implementations, the workflow error handling system 300 can be configured to provide analytics and post-facto handling of unsuccessfully executed workflow activities that occurred simultaneously or substantially simultaneously. In some implementations, the workflow error handling system 300 can be configured to identify at least one root cause associated with workflow errors. The workflow error handling system 300 can include modules such as a workflow results table 304, a query module 306, a results processing module 308, a failure definition table 310, a pattern matching module 312, a remediation module 314, a report generator 316, or a combination thereof.

The system 300 can operate on results produced by the execution of workflows configured to automate multi-step processes. A workflow definition can define one or more activities that can be executed during execution of the workflow. An executed workflow can include one or more executed activities. In an implementation, the one or more executed activities can include some or all of the one or more activities associated with a workflow. For example, a workflow can include a plurality of transitions. Transitions can define a processing path of an executed workflow. A transition can connect two activities to each other and can include a condition. For example, an approval activity can have two conditions, approved and rejected. When an approval activity is executed, a user can receive a request for approval. The request for approval can be a request to approve a change to a configuration item within a CMDB, as described above. When the user rejects the approval request, the transition can be between the approval request activity and a rejected activity (i.e., the approval request activity is executed, and the reject activity is executed). When the user approves the approval request, the transition can be between the approval request activity and an approved activity (i.e., the approval request activity is executed, and the approval activity is executed). The one or more activities can define the operations of a workflow.

When executed, activities in a workflow can perform activity tasks. Activity tasks can include running scripts, generating records, notifying users, other tasks including those that involve processing inputs or generating outputs, or a combination thereof. Workflow execution results, and associated activity execution results, can be stored as records in the workflow results table 304. For example, an activity record can include information corresponding to an executed activity.

In some implementations, an activity can invoke or include another workflow, referred to as a subworkflow. For example, a workflow can include activities or additional workflows. In an implementation, activities can be executed with or without interaction from a user or a combination thereof. For example, a notification activity, when executed, can notify a user of an event that occurs during the workflow execution. In another example, an approval activity, when executed, can pause the workflow and wait for input, such as an approval, from a user before restarting the workflow. When an activity includes a subworkflow, the subworkflow can pause the workflow while the subworkflow executes activities associated with the subworkflow. The workflow can resume when the subworkflow is complete.

The execution of activities associated with an execution of a workflow can, for example, be either successful or unsuccessful. Workflow results data can be stored in a workflow results table, for example, a workflow results table 304. The workflow results data can include a plurality of workflow results records. The workflow results records can correspond to executed activities associated with an executed workflow. A workflow results record can include information associated with an activity configuration, execution of an activity, or a combination thereof. For example, a workflow results record can include a value indicating a status (i.e., successful or unsuccessful) relating to the execution of an associated activity; an activity identifier (i.e., the type or name of an activity); context information that indicates how the activity, when executed, relates to other executed activities in the workflow execution; or other suitable data. It should be understood that while the status is disclosed as being successful or unsuccessful, other statuses can include: succeeded or failed, passed or failed, complete or incomplete, success or failure, other suitable statuses, or combinations thereof.

In an implementation, a first record can correspond to a first executed activity and a second record can correspond to a second executed activity. The first record can include an identifier that indicates an activity type or an activity name associated with the first executed activity, a value indicating that the execution of an activity was successful, and an indication that the first executed activity was ordered prior to the second executed activity in an execution of the workflow. The second record can include an identifier that indicates an activity type or an activity name associated with the second executed activity, a value indicating that the activity execution was unsuccessful, and an indication that the second executed activity was ordered after the first executed activity in the execution of the workflow. In the present example, the first executed activity was successfully executed, the second executed activity was not successfully executed, the first executed activity (and the first activity record) is a parent of the second executed activity (and the second activity record), and the second executed activity (and the second activity record) is a child of the first executed activity (and the first activity record).

In some implementations, records associated with an executed workflow within the workflow results table can, for example, be a representation of a binary search tree in a relational data structure. For example, records associated with an execution of a workflow can be organized as connected nodes. A node can correspond to an execution of an activity within the execution of the workflow. The nodes (i.e., executed activities) can be connected to each other according to a parent/child relationship with a root node being a parentless node and a leaf node being a childless node. In the context of an executed workflow, the root node can correspond to an execution of a first (or top) activity within a workflow path associated with the executed workflow and a leaf node can correspond to the execution of the last activity in a workflow activity path within the executed workflow. Executed workflows can include a single root node and can include a plurality of leaf nodes.

In some implementations, the system 300 can be configured to identify unsuccessful activity executions associated with the plurality of workflow executions and determine a failure pattern associated with the identified activity executions. The failure pattern can correspond to a failure root cause associated with the identified activity executions. In some implementations, the system 300 can be configured to automatically identify one or more remedial actions associated with the failure pattern. The system 300 can be configured to automatically execute one or more identified remedial actions for the identified unsuccessful activity executions.

In some implementations, the system 300 can include a query module 306. The query module 306 can be configured to receive a select query from an administrator associated with the computing system. Additionally, or alternatively, the query module 306 can be configured to generate a select query. The select query can comprise an order one (O(1)) computationally time complexity algorithm. The query can include query criteria that restrict query results. The query can include query criteria that restrict results returned from the workflow results table 304 to records having context information of interest and a status of interest. For example, the select query can restrict results from the workflow results table 304 to all records (or nodes) having context information indicating that the record does not have an associated child record within the workflow results table 304; context information indicating that the record is associated with a particular workflow execution, for example, a first workflow execution; and a status indicating that an associated activity execution was unsuccessful.

In some implementations, the query module 306 can be configured to query the workflow results table 304 based on the select query. For example, the workflow results records can be stored in a relational database table, such as the workflow results table 304. In an implementation, the status of the workflow results records can be stored in a status column, an indication of whether a workflow results record is childless can be stored in a child context column, and an indication that a workflow results record is associated with a particular workflow execution can be stored in a workflow execution context column. In an implementation using a database compatible with Structured Query Language (SQL), such a query could be, for example, SELECT*FROM workflow_results_table WHERE status='unsuccessful' and child_context=NULL and workflow_execution_context='first workflow execution'. The execution of such an SQL query statement by an SQL interpreter can result in the return of a result set of database records that correspond to the where condition.

The query module 306 can receive a result set based on the select query from the workflow results table. The query module 306 can store the result set in an array within an associated memory. An entry in the array includes an activity record corresponding to an unsuccessful activity execution. The system 300 can include a results processing module 308. The results processing module 308 can be configured to identify a workflow path associated with an unsuccessful activity execution. The results processing module 308 can generate a graph of workflow activity records between a record corresponding to an unsuccessful activity execution and a root activity record associated with a workflow.

For example, activity records can include context information. The context information can indicate how the executed activity relates to other executed activities in the executed workflow. For example, a first activity record can include a status and context information. The status can indicate that an execution of a first activity associated with the first activity record was unsuccessful and the context information can indicate that the first activity record is a child record of a second activity record (i.e., the second activity record is a parent of the first activity record). The results processing module 308 can be configured to instruct the query module 306 to retrieve the second activity record from the workflow results table 304. The results processing module 308 can receive, from the query module 306, and in response to querying the workflow results table 304, the second activity record.

The results processing module 308 can store an indication that the first activity record is a child of the second activity record in an associated memory. The results processing module 308 can be configured to determine whether the second activity record is a root record associated with the workflow. For example, the second activity record can include context information. The results processing module 308 can determine whether the context information indicates that the second activity record has a parent relationship with another activity record.

When the results processing module 308 determines that the second activity record has a parent relationship with another activity record, the results processing module 308 can instruct the query module 306 to query the workflow results table 304 to retrieve the second activity record's parent activity record. The results processing module 308 can store an indication that the parent activity record is a parent to the second activity record in the associated memory. The results processing module 308 can continue to identify parent activity records associated with the first activity record until the results processing module 308 identifies the root record of the executed workflow.

For example, when the results processing module 308 determines that an identified parent activity record includes context information that indicates that the parent activity record does not have a parent relationship with another record, the results processing module 308 determines that the activity is the root activity record. The results processing module 308 stores an indication that the identified parent record is the root activity record in the associated memory. In some implementations, the results processing module 308 can be configured to identify workflow paths associated with other activity records associated with unsuccessfully executed activities in parallel (i.e., substantially simultaneously).

In some implementations, the system 300 can be configured to identify a failure pattern associated with the identified workflow path. The failure pattern can correspond to a failure root cause associated with an unsuccessfully executed workflow activity. For example, a pattern matching module 312 can be configured to identify a failure pattern associated with a workflow path based on an order of activities associated with the workflow path, an activity type associated with an identified activity record associated with the workflow path (i.e., corresponding to an unsuccessfully executed activity), at least one other activity record associated with the workflow path, other records stored in the workflow results table 304 associated with one or more records associated with the workflow path, a timestamp associated with one or more activities associated with the workflow path, other information or data associated with the workflow path, or a combination thereof.

The pattern matching module 312 can be configured to apply failure patterns to the workflow path. The failure patterns can be stored in a failure definition table 310. The failure definition table 310 can include a list of failure definition records that include a failure pattern and at least one remedial action.

In one example, the first activity record can indicate that an activity associated with the first activity record includes generating a notification indicating an approval and that another activity associated with another activity record associated with the workflow path includes a change request activity. In an implementation, such a workflow path can include a request to approve a change to a configuration item within a CMDB. A user associated with the change request may have approved or rejected the change request. The first activity can include generating a notification indicating the user's approval or rejection and sending the notification to a predetermined list of users. The first activity could have failed (i.e., been unsuccessful) to generate or send the notification to at least one of the predetermined list of users.

The pattern matching module 312 can identify a failure pattern associated with the workflow path by identifying a matching failure pattern to a pattern associated with the workflow path. For example, the pattern matching module 312 can determine that the failure pattern corresponds to a pattern associated with a workflow path having a failure to generate a change approval notification by matching the workflow path failure pattern with a corresponding failure pattern stored in the failure definition table 310. The pattern matching module 312 can be configured to identify one or more remedial actions associated with the failure pattern. The one or more remedial actions can include, but are not limited to, generating a notification, sending an email, opening an incident record, generating or updating a problem record, assigning an incident or problem record to an administrator associated with the incident or problem record, generating or updating a report or a dashboard widget, or any other suitable remedial action. In some implementations, the administrator or other users associated with the computing system can define or select remedial actions associated with a failure definition. The administrator or other users can populate the failure definition table 310 based on the definitions or selections.

The pattern matching module 312 can be configured to communicate at least one remedial action associated with the failure pattern to a remediation module 314. For example, the failure definition corresponding to the failure pattern corresponding to a failure to generate a change approval notification can include a remedial action to send an email to a change owner indicating that the change approval activity was unsuccessful.

The remediation module 314 can be configured to execute remedial actions associated with unsuccessful activity executions. For example, the remediation module 314 can communicate with an email client application in order to send an email to a change owner indicating that a change approval activity associated with a workflow was unsuccessful. In some implementations, the remediation module 314 can communicate with an incident management system, a problem management system, various messaging systems, or other suitable systems capable of executing remedial actions associated with unsuccessful workflow activities.

In some implementations, the system 300 can include a report generator 316. The report generator 316 can be configured to generate one or more workflow reports. Workflow reports can include, but are not limited to, a report illustrating how many unsuccessful activity executions occurred across all executed workflows, a report illustrating activities that were unsuccessfully executed more than once, a report indicating how often the same activities were unsuccessfully executed, a report indicating activities that were unsuccessfully executed most often, or any other suitable activity or workflow report. While limited examples are illustrated, the present disclosure contemplates any number or type of workflow activity reports or analytics. In some implementations, the report generator 316 can receive a plurality of activity records corresponding to unsuccessful activity executions from the results processing module 308.

The report generator 316 can be configured to analyze, group, organize, or categorize the activity records in order to generate a particular report. The report generator 316 can be configured to traverse the workflow results table 304 in order to retrieve data or metadata associated with the activity records. In some implementations, the report generator 316 can receive workflow activity records from the query module 306. The report generator 316 can retrieve, for an associated activity record, a time stamp, an associated workflow type or name, a location associated with the performance of an associated executed activity, or other suitable data or metadata. The report generator 316 can utilize the data or metadata in order to generate various reports associated with the activity records or executed activities. In some implementations, the report generator 316 can be configured to communicate a report to a graphical dashboard or a graphical dashboard widget. The graphical dashboard or graphical dashboard widget can be configured to display a graphical representation of the report.

Implementations of the workflow error handling system 300 can include additional modules, fewer modules, combined modules, modules with additional or less functionality than modules described above, or combinations thereof. For example, as described above, the results processing module 308 can be configured to identify a workflow path between an activity corresponding to an unsuccessfully executed activity and a root activity record. In an implementation, the results processing module 308 can be configured to store identified activity records associated with a workflow path in a table, an ordered list, or other suitable data storage mechanisms. In an implementation, the report generator 316 can be configured to communicate a report to an email inbox or mobile computing device messaging application. In an implementation, the failure definition table 310 can be populated automatically, manually, or a combination thereof.

In an implementation, the remediation module 314 can be configured to communicate a selected remedial action to a user of the system 300. The remediation module 314 can be configured to report a remedial action status to a user of the system 300. For example, the remediation module 314 can be configured to execute a selected remedial action. The remediation module 314 can be configured to verify whether a remedial action was successfully executed. The remediation module 314 can, in response to the verification, communicate a status to the user.

In an implementation, some or all of the modules and components associated with the system 300 can be implemented as a software application or can execute a software application to provide some or all of the features associated with a respective module or component. For example, the pattern matching module 312 can execute a pattern matching application configured to identify patterns associated with a workflow path.

In some implementations, the system 300 can be implemented using computing devices, such as the computing device 200, or can be implemented as described with respect to system 100 in FIGS. 1 and 2. In some implementations, the system 300 can be implemented, for example, by a machine-readable program or other computer-executable instructions, such as instructions or programs described according to JavaScript, C, or other such instructions. The modules of the system 300 can, for example, be implemented using computer hardware, firmware, software executed by hardware, circuitry, or a combination thereof.

Figure 4:
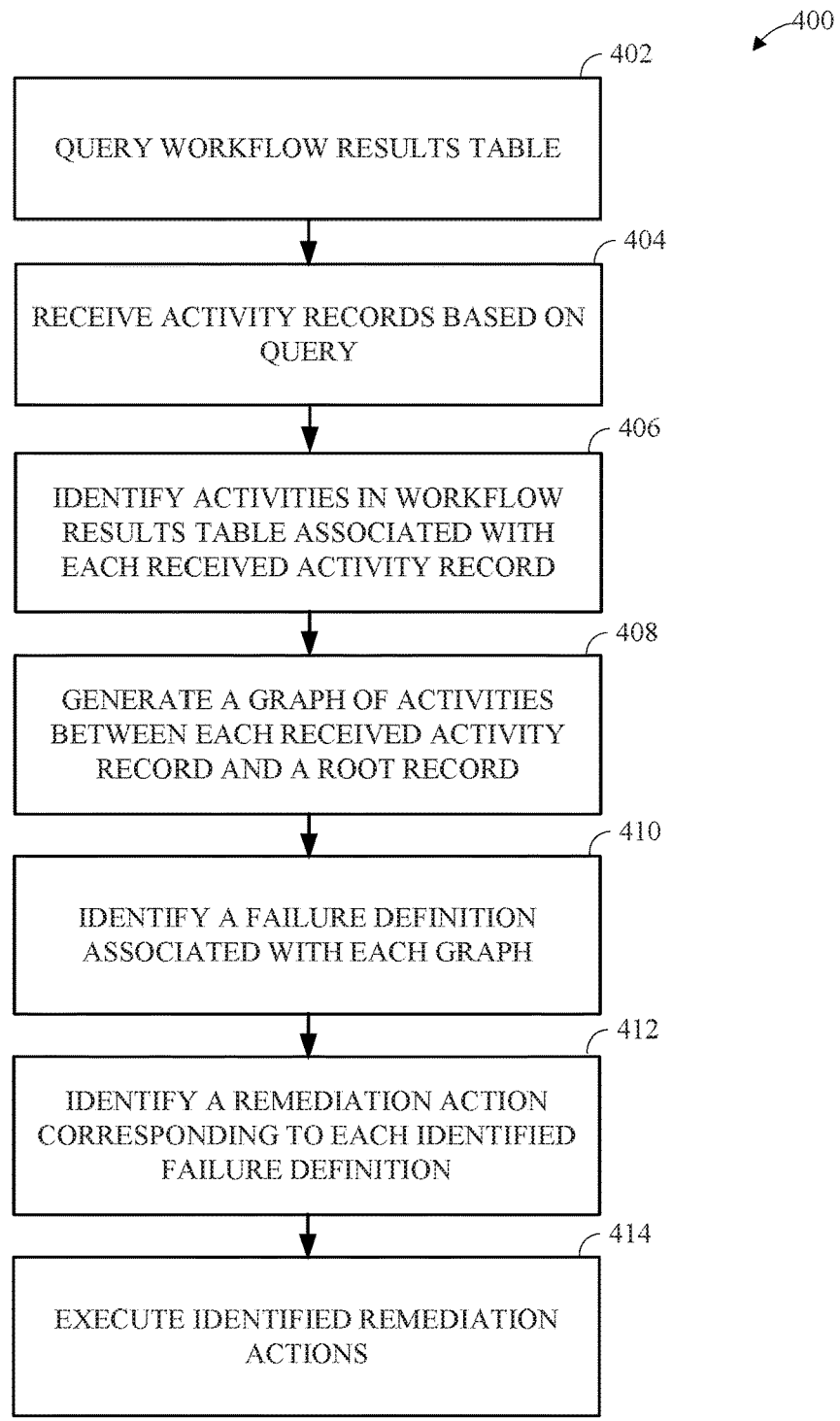
FIG. 4 is a flowchart of a technique for workflow error handling.

FIG. 4 is a flowchart of a technique for workflow error handling. In some implementations, a technique 400 can be executed using computing devices, such as the systems, modules, and devices described with respect to FIGS. 1, 2, and 3. In some implementations, the technique 400 can be performed, for example, by executing a machine-readable program or other computer-executable instructions, such as instructions or programs described according to JavaScript, C, or other such instructions. The steps, or operations, of the technique 400 or any other technique, process, or algorithm described in connection with the implementations disclosed herein can be implemented directly in hardware, firmware, software executed by hardware, circuitry, or a combination of these.

At 402, the technique 400 can query a workflow results table. For example, as described above, the query module 306 can query the workflow results table 304 based on a select query. The select query can be designed to retrieve workflow activity records corresponding to unsuccessfully executed workflow activities. At 404, the technique 400 receives activity records corresponding to unsuccessfully executed workflow activities. For example, as described above, the results processing module 308 can receive a plurality of activity records corresponding to unsuccessful activity executions. At 406, the technique 400 identifies workflow activity records associated with an activity record corresponding to an unsuccessfully executed activity. For example, as described above, the results processing module 308 can identify parent activity records associated with the activity record. At 408, the technique 400 generates a graph of activities between an activity record corresponding to an unsuccessfully executed activity and an identified root activity record.

At 410, the technique 400 identifies a failure definition associated with a graph. For example, as described above, the pattern matching module 312 can identify a failure pattern associated with a graph (i.e., a workflow path). The pattern matching module 312 can identify a failure pattern associated with a workflow path with a failure pattern stored in the failure definition table 310. The pattern matching module 312 identifies a failure definition corresponding to an identified failure pattern. At 412, the technique 400 identifies at least one remedial action corresponding to the identified failure definitions. For example, as described above, a failure definition can include one or more remedial actions associated with a failure pattern. The pattern matching module 312 can identify at least one remedial action corresponding to an identified failure pattern (i.e., associated with an identified failure definition). The pattern matching module 312 can communicate the identified remedial actions to the remediation module 314. At 414, the technique 400 executes the identified remedial actions. For example, as described above, the remediation module 314 can be configured to execute identified remedial actions.

Although the technique 400 is shown as a series of operations for clarity, implementations of the technique 400 or any other technique, process, or algorithm described in connection with the implementations disclosed herein can be performed in various orders or concurrently. Additionally, operations in accordance with this disclosure can be performed with other operations not presented and described herein. Furthermore, one or more aspects of the systems and techniques described herein can be omitted. In an implementation, the technique 400 can include communicating a selected remedial action to a user associated with the system 300. The technique 400 can include reporting a remedial action status to a user. For example, the technique can include verifying that a remedial action was successfully executed.

Figure 5:
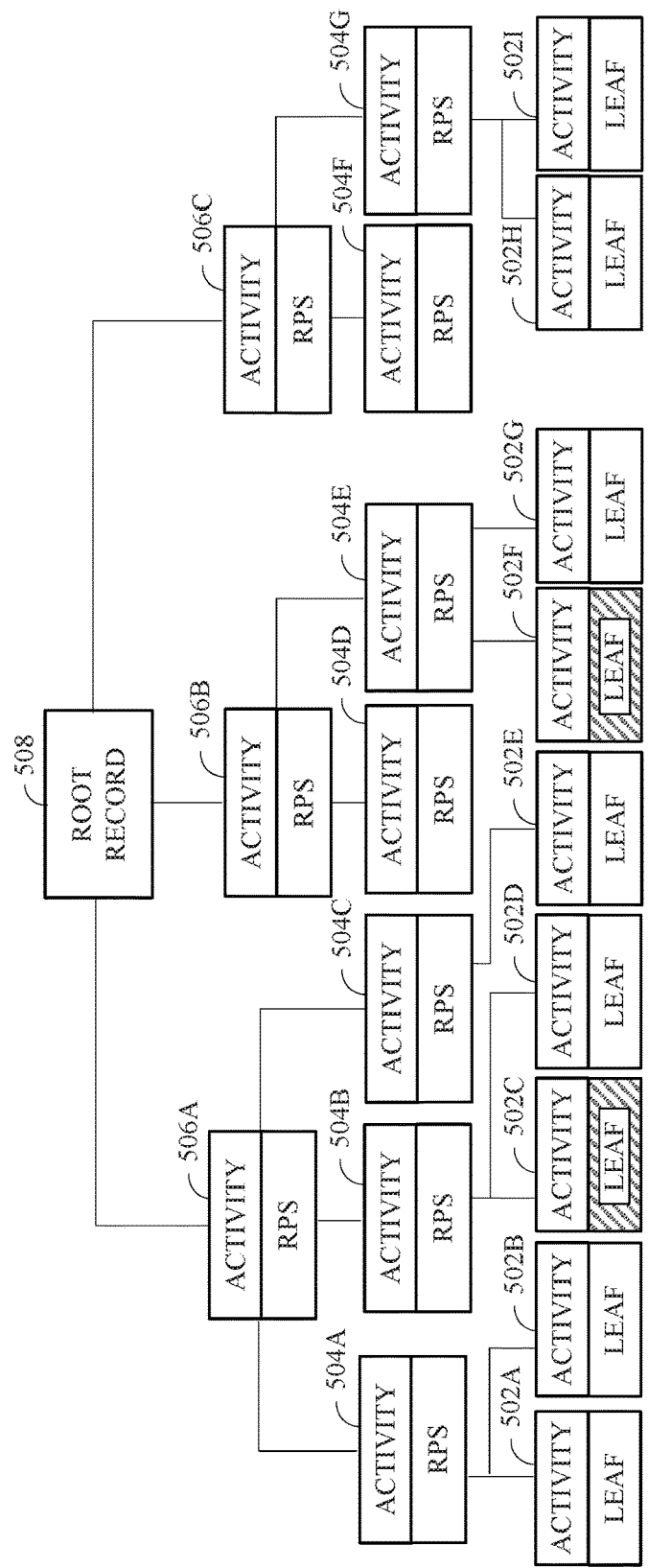
FIG. 5 is a graphical illustration of a workflow results data graph.

FIG. 5 is a graphical illustration of a workflow results data graph. The data graph can include a plurality of workflow activity records. The plurality of workflow activity records can include a root record 508, including information corresponding to a root activity execution, a plurality of activity/run parallel subflow (RPS) records 506A-506C and 504A-504G, including information corresponding to subworkflow activity executions, and a plurality of leaf activity records 502A-502I, including information corresponding to leaf activity executions. A root activity execution associated with the root record 508 can be a first activity executed in a workflow path. A subworkflow activity execution associated with an activity/RPS record can be an activity that is executed after the first workflow activity in a workflow path. A leaf activity execution associated with a leaf activity record can be an activity that is executed last in a workflow activity path. As explained above, the plurality of workflow activity records can include, among other things, a value indicating a status of an activity execution and context information indicating how an activity is related to other activities within the workflow.

In the example illustrated, the leaf activity record 502C can correspond to an execution of a first activity and the leaf activity record 502F can correspond to an execution of a second activity. The leaf activity records 502C and 502F can include a value indicating that the execution of the first activity and the execution of the second activity, respectively, were unsuccessful. The leaf activity record 502C can include context information indicating that the activity/RPS record 504B is a parent record of the leaf activity record 502C and that the leaf activity record 502C does not have a child relationship with another workflow activity record. The activity/RPS record 504B can include context information indicating that the activity/RPS record 506A is a parent record of the activity/RPS record 504C. The activity/RPS record 506A can include context information indicating that the root record 508 is a parent record of the activity/RPS record 506A. The root record 508 can include context information indicating that the root record 508 does not have a parent relationship with another workflow activity record. As described above, the results processing module 308 can identify a workflow activity path between an activity record associated with an unsuccessfully executed activity and a root record. The results processing module 308 can identify and store a workflow activity path between the leaf activity record 502C and the root record 508. The path can include the leaf activity record 502C, the activity/RPS record 504B, the activity/RPS record 506A, and the root record 508.

Similarly, the leaf activity record 502F can include context information indicating that the activity/RPS record 504E is a parent record of the leaf activity record 502F and that the leaf activity record 502F does not have a child relationship with another workflow activity record. The activity/RPS record 504E can include context information indicating that the activity/RPS record 506B is a parent record of the activity/RPS record 504E. The activity/RPS record 506B can include context information indicating that the root record 508 is a parent record of the activity/RPS record 506B. The results processing module 308 can identify and store a workflow activity path between the leaf activity record 502F and the root record 508, the path including the leaf record 502F, the activity/RPS record 504E, the activity/RPS record 506B, and the root record 508.

Figure 6:
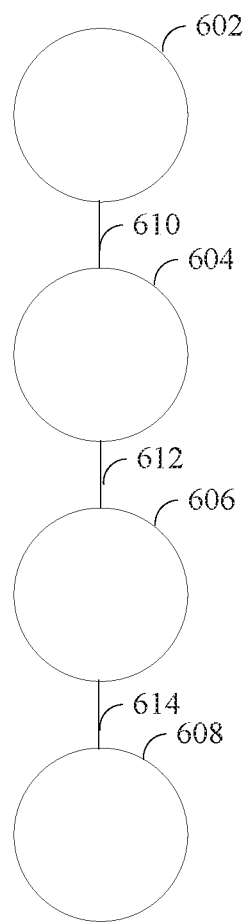
FIG. 6 is a graphical illustration of a workflow activity graph illustrating an example workflow activity path.

FIG. 6 is a graphical illustration of a workflow activity graph illustrating an example workflow activity path. In an example, the workflow activity graph illustrated in FIG. 6 can be a graphical representation of the identified workflow activity path illustrated in FIG. 5. For example, the workflow activity path includes the leaf activity record 502C, the activity/RPS record 504B, the activity/RPS record 506A, and the root record 508. The graph includes a root node 602. The root node 602 can be a graphical representation of the root record 508. The graph can include activity nodes 604 and 606. The activity node 604 can be a graphical representation of the activity/RPS record 506A and the activity node 606 can be a graphical representation of the activity/RPS record 504B. The graph can include a leaf node 608. The leaf node 608 can be a graphical representation of the leaf activity record 502C. In an implementation, the graph can include edges 610, 612, and 614. An edge can be a graphical representation of a transition between activities that can be defined in context information associated with an activity record. For example, an edge can represent a parent or child relationship between two records indicated by the context information. In the example, the edge 614 can graphically represent the context information indicating that the activity/RPS record 504B is a parent record of the leaf activity record 502C. The edge 612 can graphically represent the context information indicating that the activity/RPS record 506A is a parent record of the activity/RPS record 506A. The edge 610 can graphically represent the context information indicating that the root record 508 is a parent record of the activity/RPS record 506A.

All or a portion of the aspects of the systems and techniques described herein can be implemented using a general purpose computer/processor with a computer program that, when executed, carries out any of the respective techniques, algorithms, or instructions described herein. In addition, or alternatively, for example, a special-purpose computer/processor can be utilized, which can contain specialized hardware for carrying out any of the techniques, algorithms, or instructions described herein.

The implementations of computing devices as described herein (and the algorithms, techniques, instructions, etc., stored thereon or executed thereby) can be realized in hardware, software, or a combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination.

For example, one or more computing devices can include an ASIC or programmable logic array, such as a field-programmable gate array (FPGA) configured as a special-purpose processor to perform one or more of the operations described or claimed herein. An example FPGA can include a collection of logic blocks and random access memory (RAM) blocks that can be individually configured or configurably interconnected in order to cause the FPGA to perform certain functions. Certain FPGAs can contain other general- or special-purpose blocks as well. An example FPGA can be programmed based on a hardware definition language (HDL) design, such as VHSIC Hardware Description Language or Verilog.

The embodiments herein can be described in terms of functional block components and various processing operations. Such functional block components can be realized by any number of hardware or software components that perform the specified functions. For example, the described embodiments can employ various integrated circuit components, e.g., memory elements, processing elements, logic elements, look-up tables, and the like, which can carry out a variety of functions under the control of one or more microprocessors or other control devices. Similarly, where the elements of the described embodiments are implemented using software programming or software elements, the systems and techniques can be implemented with any programming or scripting language, such as C, C++, Java, assembler, or the like, with the various algorithms being implemented with a combination of data structures, objects, processes, routines, or other programming elements. Functional aspects can be implemented in algorithms that execute on one or more processors. Furthermore, the embodiments of the systems and techniques could employ any number of conventional techniques for electronics configuration, signal processing or control, data processing, and the like. The words "mechanism" and "element" are used broadly and are not limited to mechanical or physical embodiments, but can include software routines in conjunction with processors, etc.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or a semiconductor device. Other suitable mediums are also available. Such computer-usable or computer-readable media can be referred to as non-transitory memory or media, and can include RAM or other volatile memory or storage devices that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. For example, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise; or clearly indicated otherwise by the context to be directed to a singular form. Moreover, use of the term "an implementation" or the term "one implementation" throughout this disclosure is not intended to mean the same embodiment or implementation unless described as such.

The particular implementations shown and described herein are illustrative examples of the systems and techniques and are not intended to otherwise limit the scope of the systems and techniques in any way. For the sake of brevity, conventional electronics, control systems, software development, and other functional aspects of the systems (and components of the individual operating components of the systems) cannot be described in detail. Furthermore, the connecting lines, or connectors, shown in the various figures presented are intended to represent example functional relationships or physical or logical couplings between the various elements. Many alternative or additional functional relationships, physical connections, or logical connections can be present in a practical device. Moreover, no item or component is essential to the practice of the systems and techniques unless the element is specifically described as "essential" or "critical."

The use of the terms "including," "comprising," "having," or variations thereof herein is meant to encompass the items listed thereafter and equivalents thereof as well as additional items. Unless specified or limited otherwise, the terms "mounted," "connected," "supported," "coupled," and variations thereof are used broadly and encompass both direct and indirect mountings, connections, supports, and couplings. Further, "connected" and "coupled" are not restricted to physical or mechanical connections or couplings.

The use of the terms "a," "an," and "the," and similar referents in the context of describing the systems and techniques (especially in the context of the following claims) should be construed to cover both the singular and the plural. Furthermore, unless otherwise indicated herein, the recitation of ranges of values herein is merely intended to serve as a shorthand alternative to referring individually to each separate value falling within the range, and each separate value is incorporated into the specification as if it were individually recited herein. Finally, the operations of all techniques described herein are performable in any suitable order unless otherwise indicated herein or clearly indicated otherwise by the context. The use of any and all examples, or exemplary language (e.g., "such as"), provided herein is intended merely to better illuminate the systems and techniques and does not pose a limitation on the scope of the systems and techniques unless otherwise claimed.

All references, including publications, patent applications, and patents, cited herein are hereby incorporated by reference to the same extent as if each reference were individually and specifically indicated as incorporated by reference and were set forth in its entirety herein.

The above-described embodiments have been described in order to facilitate easy understanding of the present systems and techniques, and such descriptions of such implementations do not limit the present systems and techniques. To the contrary, the present systems and techniques are intended to cover various modifications and equivalent arrangements included within the scope of the appended claims, which scope is to be accorded the broadest interpretation as is permitted by law so as to encompass all such modifications and equivalent arrangements.

What is claimed is:

1. A method for identifying an unsuccessfully executed workflow activity and a workflow path associated with the unsuccessfully executed workflow activity, the method comprising:
generating, by a processor of a server device, a query for identifying records in a workflow results table, the query including query criteria to include a) records not having an associated child in the workflow results table and b) records having a value indicating an unsuccessful status;
executing, by the processor of the server device, the query against the workflow results table to identify at least one activity record having a value indicating an unsuccessful status for an execution of at least one respective workflow activity;
generating, by the processor of the server device, a graph of workflow activity records between the at least one activity record and a root workflow activity record using context information associated with the workflow activity records;
identifying, via the processor of the server device, a failure pattern associated with the graph;
identifying, via the processor of the server device, a failure root cause of the unsuccessfully executed workflow activity based on the failure pattern;
generating, via the processor of the server device, a workflow error report identifying the failure root cause of the unsuccessfully executed workflow activity; and
transmitting, via the processor of the server device, the workflow error report for display on a graphical dashboard display.

2. The method of claim 1, wherein the identified failure pattern corresponds to the failure root cause associated with the at least one activity record and the value.

3. The method of claim 1, wherein the at least one respective workflow activity includes at least one of: running a script, sending a notification, and requesting approvals.

4. The method of claim 1, wherein generating the workflow error report comprises generating an email indicating a failure type associated with an unsuccessful workflow activity.

5. The method of claim 1, comprising:
determining, by the processor of the server device, an automated remedial action based on the failure pattern and the failure root cause; and
executing, by the processor of the server device, the automated remedial action;
wherein the automated remedial action includes generating an incident record.

6. The method of claim 5, comprising assigning the incident record to an administrator associated with the at least one activity record.

7. The method of claim 1, comprising updating the workflow error report based on the at least one activity record, the graph of the workflow activity records, and the value.

8. The method of claim 7, wherein the workflow error report includes a heat-map of unsuccessful activities across multiple workflows.

9. A system for identifying an unsuccessfully executed workflow activity and a workflow path associated with the unsuccessfully executed workflow activity, the system comprising:
a server device including a processor, a memory, and a network interface, the memory including instructions executable by the processor to:
generate, via the processor of the server device, a query for identifying records in a workflow results table, the query including query criteria to include records not having an associated child in the workflow results table and records having a value indicating an unsuccessful status;
execute, via the processor of the server device, the query against the workflow results table to identify at least one activity record having a value indicating an unsuccessful status for an execution of at least one respective workflow activity;
generate, via the processor of the server device, a graph of workflow activity records between the at least one activity record and a root workflow activity record using context information associated with the workflow activity records;
identify, via the processor of the server device, a failure pattern associated with the graph;
identify, via the processor of the server device, a failure root cause of the unsuccessfully executed workflow activity based on the failure pattern;
generate, via the processor of the server device, a workflow error report identifying the failure root cause of the unsuccessfully executed workflow activity; and
transmit, via the processor of the server device, the workflow error report for display on a graphical dashboard display.

10. The system of claim 9, wherein the identified failure pattern corresponds to the failure root cause associated with the at least one activity record and the value.

11. The system of claim 9, wherein the at least one respective workflow activity includes at least one of: running a script, sending a notification, and requesting approvals.

12. The system of claim 9, wherein the instructions include instructions executable by the processor to:
determine, via the processor of the server device, an automated remedial action based on the failure pattern and the failure root cause; and
executing, via the processor of the server device, the automated remedial action;
wherein the automated remedial action includes generating an email indicating a failure associated with an unsuccessful workflow activity.

13. The system of claim 12, wherein the automated remedial action includes generating an incident record.

14. The system of claim 13, wherein the instructions include instructions executable by the processor to assign the incident record to an administrator associated with the at least one activity record.

15. The system of claim 9, wherein the instructions include instructions executable by the processor to update the workflow error report based on the at least one activity record, the graph of the workflow activity records, and the value.

16. The system of claim 15, wherein the workflow error report includes a heat-map of unsuccessful activities across multiple workflows.

17. A system for identifying an unsuccessfully executed workflow activity and a workflow path associated with the unsuccessfully executed workflow activity, the system comprising:
- a server device including a processor, a memory, and a network interface, the memory including instructions executable by the processor to:
    - receive, via the processor of the server device, at least one workflow activity record having context information indicating that the at least one workflow activity record does not have an associated child in a workflow results table and having a value indicating an unsuccessful status for an execution of an activity associated with an execution of a workflow;
    - identify, via the processor of the server device, based on the context information associated with the at least one workflow activity record, one or more parent activity records for the at least one workflow activity record;
    - identify, via the processor of the server device, a root workflow activity record based on a determination of whether one of the one or more parent activity records has an associated child in the workflow results table and does not have an associated parent in the workflow results table;
    - generate, via the processor of the server device, a graph of workflow activity records between the at least one workflow activity record and an identified root workflow activity record;
    - identify, via the processor of the server device, a failure definition associated with the graph of workflow activity records;
    - identify, via the processor of the server device, a failure root cause of the workflow activity record based on the failure definition;
    - generate, via the processor of the server device, a workflow error report identifying the failure root cause of the workflow activity record; and
    - transmit, via the processor of the server device, the workflow error report for display on a graphical dashboard display.

* * * * *